United States Patent [19]

Ikuta et al.

[11] Patent Number: 5,406,919
[45] Date of Patent: Apr. 18, 1995

[54] FUEL INJECTION SYSTEM FOR INTERNAL COMBUSTION ENGINE

[75] Inventors: Kenji Ikuta, Rolling Hills Estates, Calif.; Hisashi Iida, Aichi; Takanori Takahashi, Kariya, both of Japan

[73] Assignee: Nippondenso Co., Ltd., Aichi, Japan

[21] Appl. No.: 45,427

[22] Filed: Apr. 13, 1993

[30] Foreign Application Priority Data

Apr. 15, 1992 [JP] Japan ................... 4-095015
Jul. 9, 1992 [JP] Japan ................... 4-181449

[51] Int. Cl.6 ............................................. F02D 41/08
[52] U.S. Cl. ...................................... 123/339; 123/585
[58] Field of Search ................................ 123/339, 585

[56] References Cited

U.S. PATENT DOCUMENTS

| 4,465,050 | 8/1984  | Igashira et al. | 123/585 X |
| 5,024,201 | 6/1991  | Kobayashi et al. | 123/585 X |
| 5,148,788 | 9/1992  | Saikalis et al. | 123/585 X |
| 5,170,761 | 12/1992 | Kato et al. | 123/339 |
| 5,211,148 | 5/1993  | Furuya et al. | 123/585 X |

FOREIGN PATENT DOCUMENTS

| 0153012   | 8/1985  | European Pat. Off. . |
| 57-54624  | 11/1982 | Japan . |
| 58-162262 | 10/1983 | Japan . |
| 58-206851 | 12/1983 | Japan . |
| 61-112773 | 5/1986  | Japan . |
| 1-96457   | 4/1989  | Japan . |
| 2119971   | 11/1983 | United Kingdom . |
| 2168830   | 6/1986  | United Kingdom . |
| 2227580   | 8/1990  | United Kingdom . |

*Primary Examiner*—Tony M. Argenbright
*Attorney, Agent, or Firm*—Cushman, Darby & Cushman

[57] ABSTRACT

A fuel injection system for an internal combustion engine introduces, via an air passage bypassing a throttle valve, a portion of intake air flowing in an induction system of the engine to an area where fuel is injected from a fuel injection valve, so as to facilitate atomization of the injected fuel. The air passage includes therein a flow control unit for opening and closing the air passage. During an engine idling, a total opening time of the air passage effected by the flow control unit is variably controlled for adjusting a supply mount of the intake air through the air passage so as to realize a target idling engine speed. As a result, the intake air fed through the air passage works not only to facilitate the atomization of the injected fuel, but also to control the idling engine speed to the target value.

5 Claims, 14 Drawing Sheets

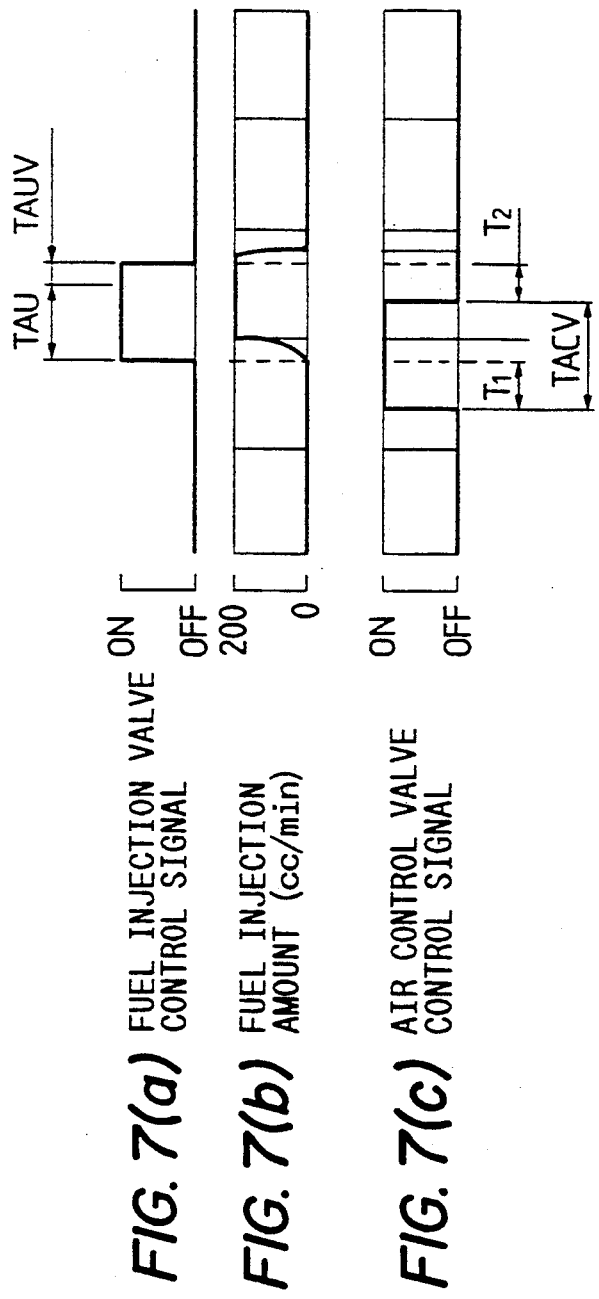

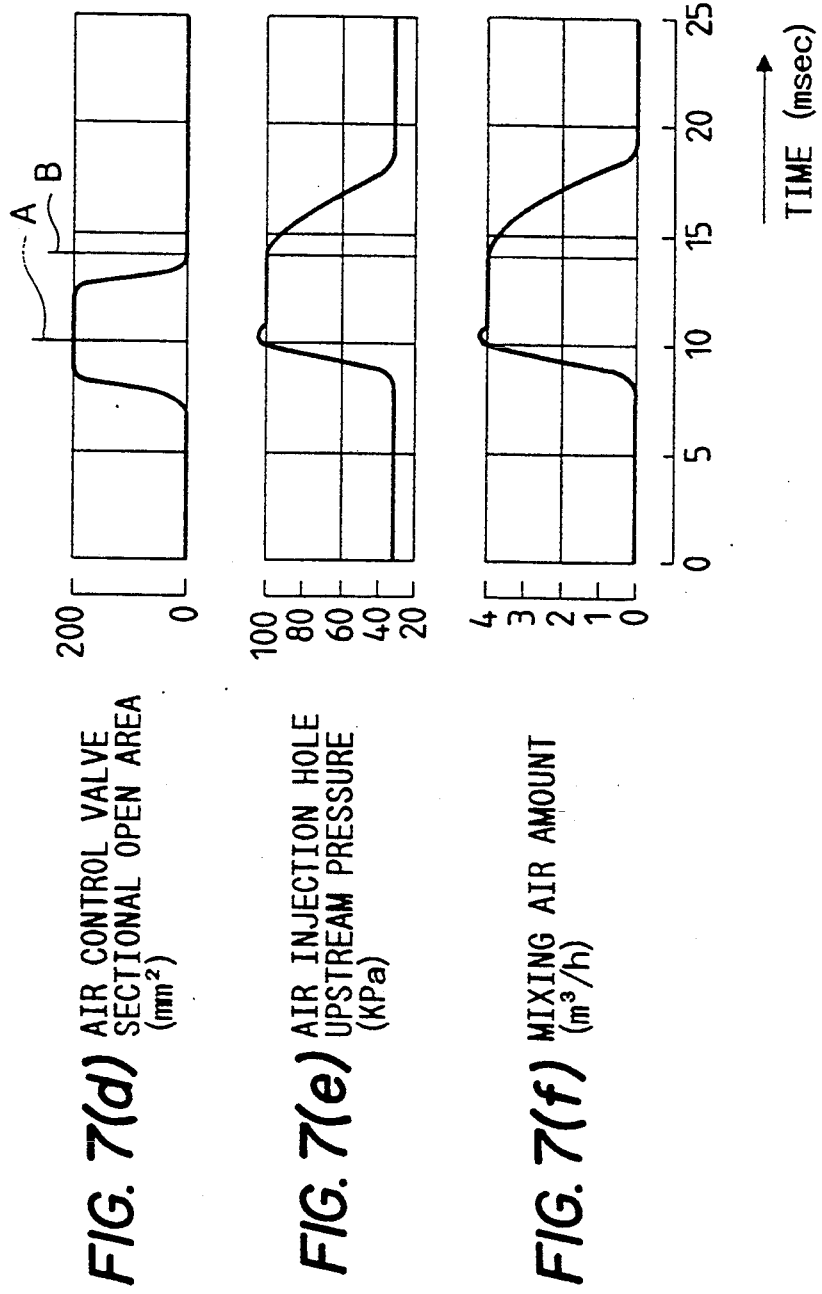

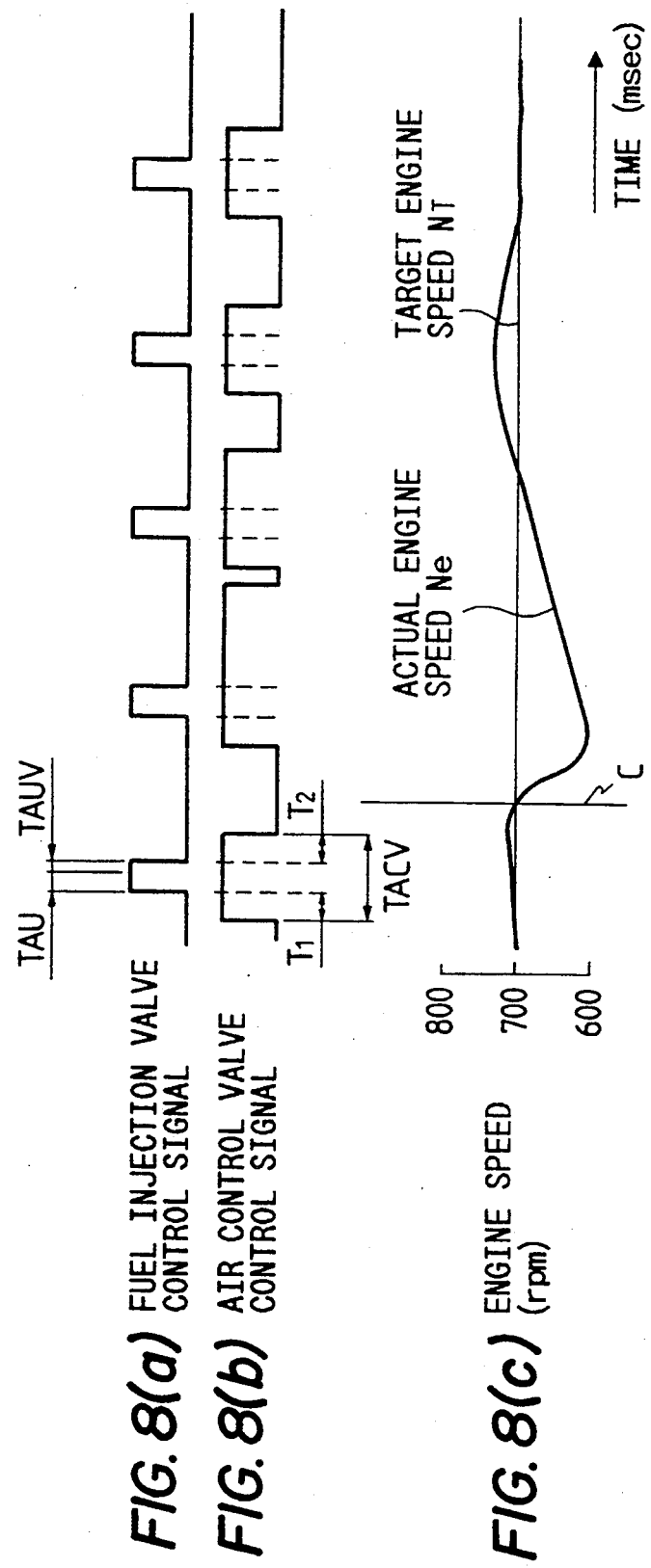

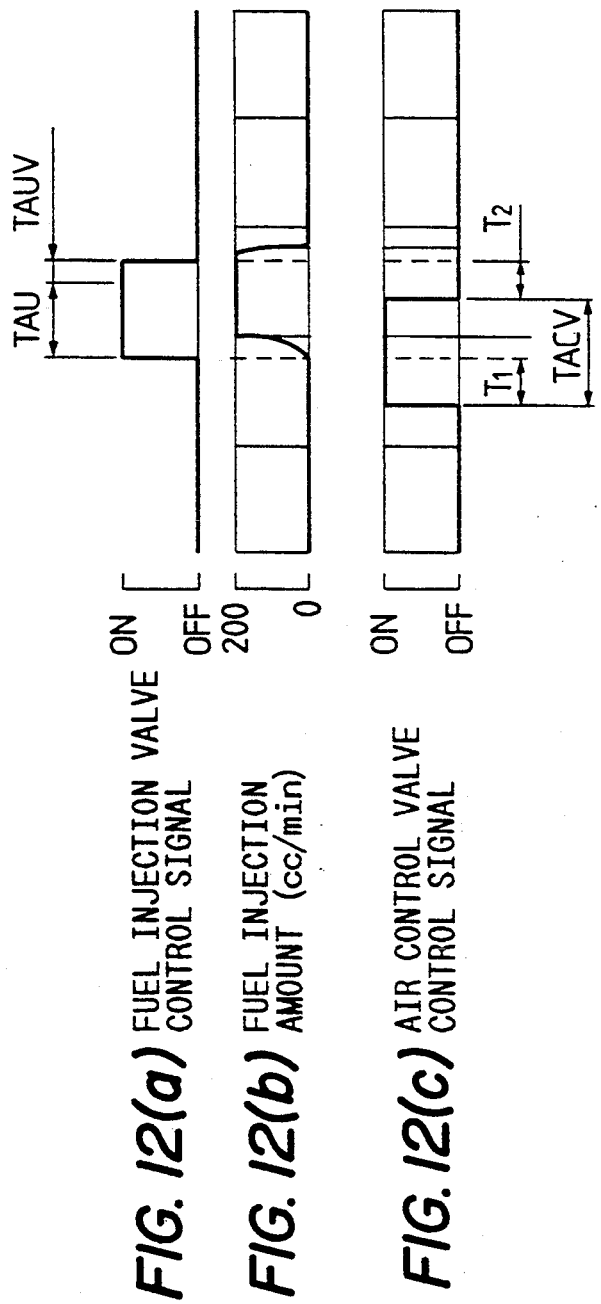

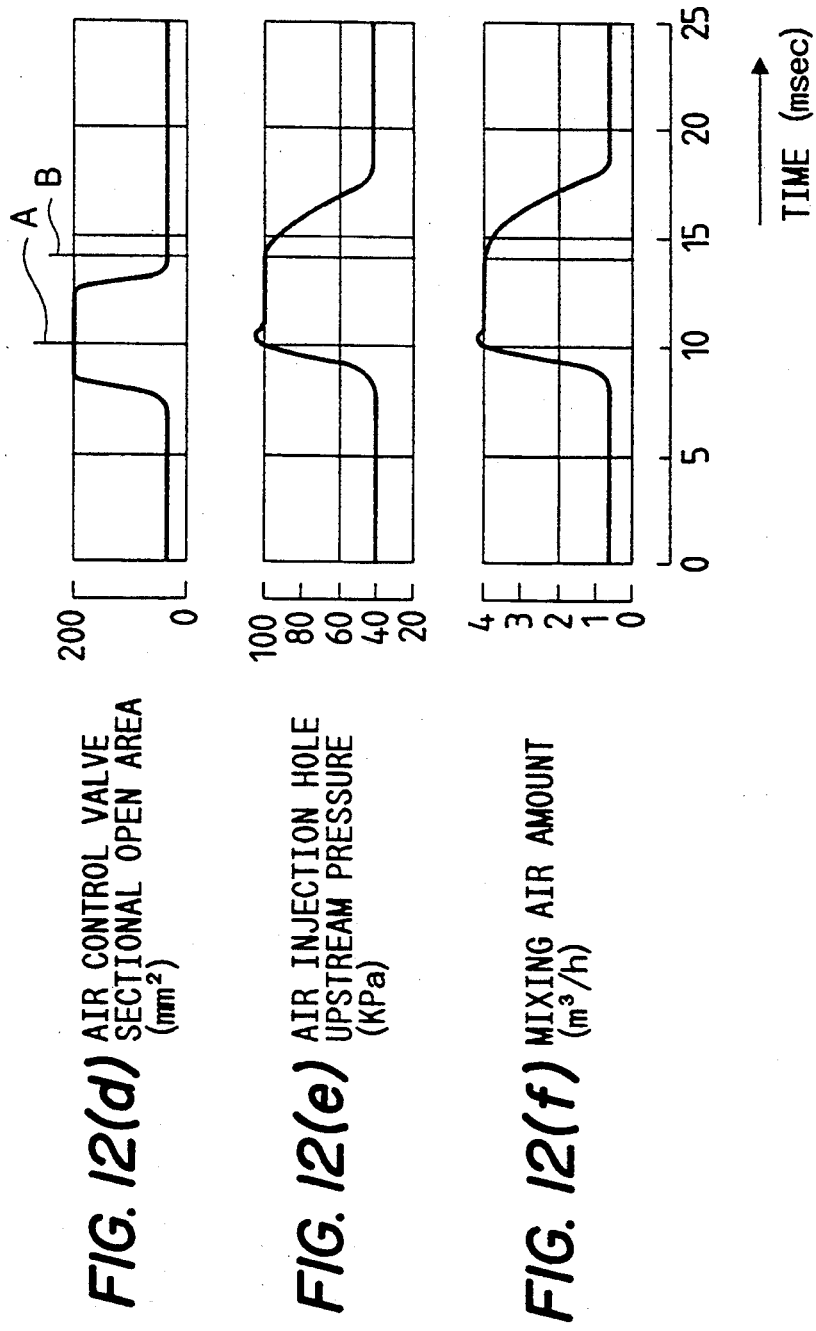

FUEL INJECTION SYSTEM FOR INTERNAL COMBUSTION ENGINE

BACKGROUND OF THE INVENTION

1. Field of the Invention

The present invention relates generally to a fuel injection system for an internal combustion engine, and more specifically, to the fuel injection system, wherein a portion of intake air upstream of a throttle valve is introduced, bypassing the throttle valve, to an area where fuel is injected from a fuel injection valve, so as to facilitate atomization of the injected fuel for reducing harmful components involved in exhaust gas.

2. Description of the Prior Art

In a fuel injection system which injects fuel into an induction system of an internal combustion engine via a fuel injection valve so as to control an operating condition of the engine, it has been strongly demanded that atomization of the injected fuel be facilitated so as to reduce injurious components involved in exhaust gas which are otherwise increased due to a deterioration of combustion in the engine. In order to satisfy this demand, there have been proposed fuel injection systems as disclosed, such as, in Japanese Second (examined) Patent Publication No. 57-54624 and Japanese First (unexamined) Utility Model Publication No. 58-162262.

In either of such disclosed systems, the upstream side of a throttle valve is connected to the vicinity of an injection hole of a fuel injection valve via an air duct with an air control valve disposed therein, bypassing the throttle valve. With this structure, when effective atomization of fuel injected from the injection hole of the fuel injection valve is not expected, such as, during an engine idling, the air control valve is controlled to open and close substantially in synchronism with the fuel injection. Accordingly, during the engine idling, a portion of the intake air upstream of the throttle valve, which is close to the atmospheric pressure, is introduced to the neighborhood of the fuel injection hole via the air duct for a time period substantially synchronous with the fuel injection by means of the opening and closing operation of the air control valve so as to facilitate the atomization of the injected fuel. Since the supply of the intake air via the air duct is limited to the time period of the fuel injection, the atomization of the injected fuel is effected to a sufficient level with an idling engine speed being prevented from increasing in comparison with a continuous supply of the intake air via the air duct.

In either of the foregoing conventional fuel injection systems, however, since a known idling speed control valve should be separately provided for adjusting the idling engine speed, the entire system inevitably becomes complicated. Specifically, the system performs the control of the opening and closing operation of the air control valve substantially in synchronism with that of the fuel injection valve in addition to an opening degree control of the known idling speed control valve. This may lead to an increased manufacturing cost of the system.

On the other hand, another fuel injection system has been proposed as disclosed in, such as, Japanese First (unexamined) Patent Publication No. 58-206851. Intake air on the upstream side of a throttle valve is introduced into a serge tank as well as to the vicinity of a fuel injection hole of a fuel injection valve via an air duct with an air control valve disposed therein. A supply amount of the intake air via the air duct is adjusted by a duty-cycle control which controls an opening degree of the air control valve.

As appreciated, the supply of the intake air from the upstream side of the throttle valve to the vicinity of the fuel injection hole via the air duct is realized by means of a pressure differential between an intake vacuum generated in an intake port of the engine and a pressure close to the atmospheric pressure in the air duct. Accordingly, in order to ensure a sufficiently high level of the pressure differential, a sectional open area of the air duct should be set to a value which is at least about two to three times as large as a sum of a sectional open area of each air injection hole or a total air injecting area through which the intake air is injected to the neighborhood of the fuel injection hole.

In the foregoing conventional fuel injection system as disclosed in Japanese First (unexamined) Patent Publication No. 58-206851, however, since the opening degree of the air control valve in the air duct is controlled as described above, a pressure loss or drop is caused when the intake air flows through the air control valve, resulting in a reduction of the above-noted pressure differential. This, in turn, causes dropping of a flow velocity of the intake air injected from each air injecting hole, leading to a likelihood that the atomization of the injected fuel is not realized to a sufficient level.

Further, in known fuel injection systems, including those as described above, when the throttle valve is substantially closed, i.e. under a low engine load, a pressure generated on the downstream side of the air control valve largely fluctuates due to the opening and closing operation of the air control valve, which produces a pulsation noise of a high level in synchronism with the pressure fluctuation to increase a noise in a passenger's compartment. In order to solve this problem, it may be one option to provide, for example, a known resonator as having been employed for reducing a pulsation noise when, such as, controlling the idling engine speed with the idling speed control valve. However, as appreciated, since the resonator utilizes the resonance principle, a suppressible pulsation noise is limited to a specific frequency band. Accordingly, when a frequency of the pulsation noise largely varies depending on an engine speed as in the above-noted case, the provision of the resonator is hardly effective.

SUMMARY OF THE INVENTION

Therefore, it is an object of the present invention to provide an improved fuel injection system for an internal combustion engine that can eliminate one or more of the above-noted defects inherent in the conventional fuel injection systems.

To accomplish the above-mentioned and other objects, according to one aspect of the present invention, a fuel injection system for an internal combustion engine comprises means for detecting an operating condition of the engine; fuel injection means, provided in an induction system of the engine, for injecting a required amount of fuel to the induction system in accordance with the operating condition of the engine detected by the detecting means; an air passage for introducing a portion of intake air flowing in the induction system, bypassing a throttle valve, to an area where the fuel is injected from the fuel injection means; means, provided in the air passage, for opening and closing the air passage; operation control means for maintaining the opening and closing means in an opening position for a time period which is substantially synchronous with the fuel injection of the fuel injection means; and means for correcting, during an engine idling detected by the detecting means, a total opening time of the opening and closing means effected by the operation control means so as to control an idling engine speed to a required value.

According to another aspect of the present invention, a fuel injection system for an internal combustion engine comprises means for detecting an operating condition of the engine; fuel injection means, provided in an induction system of the engine, for injecting a required amount of fuel to the induction system in accordance with the operating condition of the engine detected by the detecting means; air conducting means for introducing a portion of intake air flowing in the induction system, bypassing a throttle valve, to an area where the fuel is injected from the fuel injection means; means provided in the air conducting means and operated to an opening position for opening the air conducting means and to a closing position for closing the air conducting means; means for controlling the operation of the opening and closing means, the controlling means, during an engine idling detected by the detecting means, deriving a correction value per fuel injection effected by the fuel injection means to correct a total time of the opening and closing means being operated at the opening position per fuel injection in such a manner as to realize a required idling speed of the engine.

According to still another aspect of the present invention, the opening and closing means may include means for providing a predetermined opening degree when the opening and closing means is in the closing position. The predetermined opening degree is set smaller than an opening degree provided when the opening and closing means is in the opening position.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to be limitative of the present invention.

In the drawings:

FIGS. 7(a) through 7(f) are time charts showing a state, wherein a supply of mixing air is substantially synchronous with an actual fuel injection from the fuel injection valve, according to the first preferred embodiment of the present invention;

FIGS. 8(a) through 8(c) are time charts showing a relationship between the control signals for the fuel injection valves and the air control valves when the monitored engine speed is dropped due to increment of an engine load;

FIGS. 12(a) through 12(f) are time charts showing a state, wherein a supply of the mixing air is substantially synchronous with an actual fuel injection from the fuel injection valve, according to the second preferred embodiment of the present invention;

DESCRIPTION OF THE PREFERRED EMBODIMENT

Figure 1:
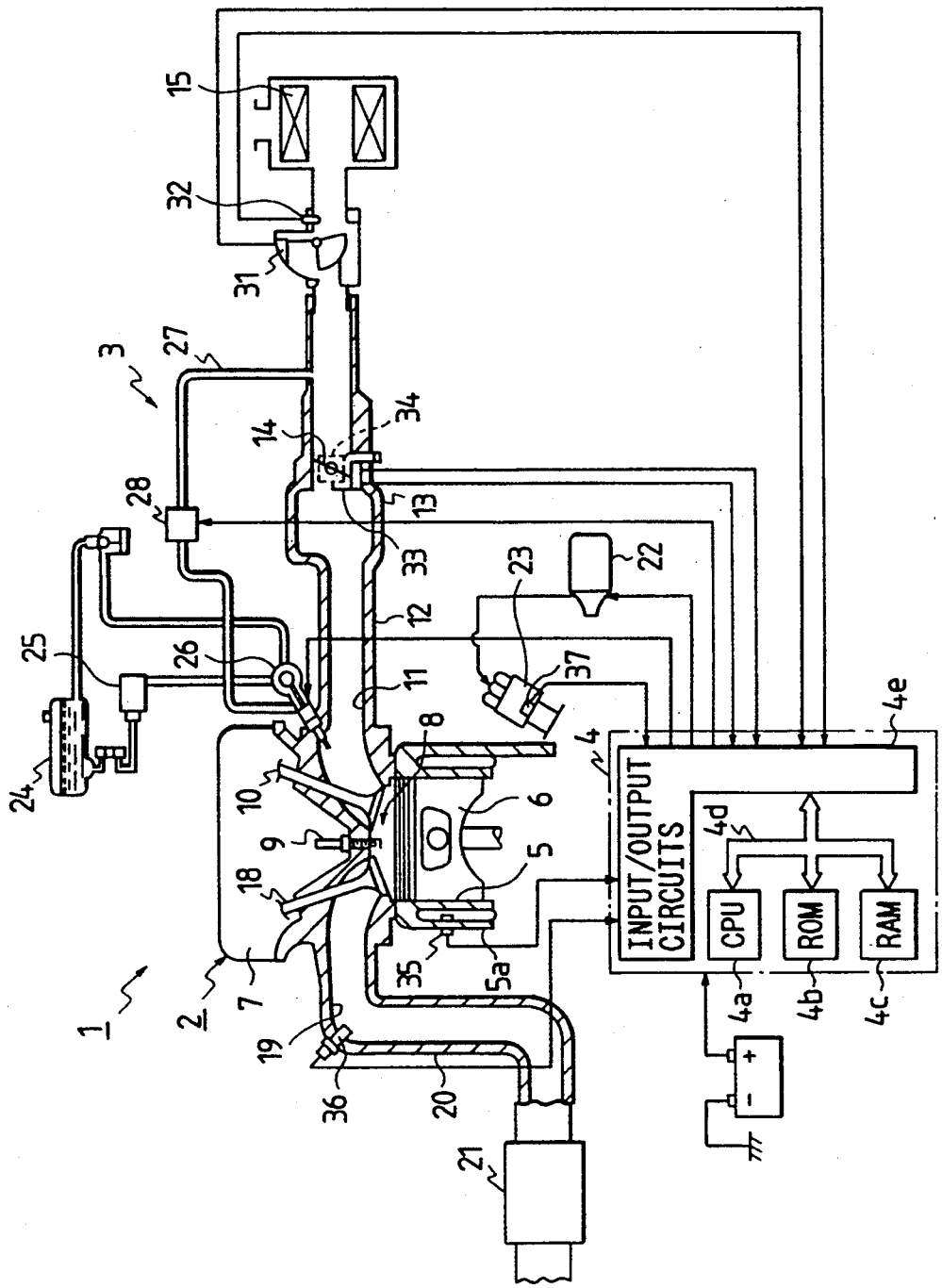
FIG. 1 is a diagram showing an entire structure of a fuel injection system for an internal combustion engine according to a first preferred embodiment of the present invention.

Referring now to the drawings, FIG. 1 shows the entire structure of a fuel injection system for an internal combustion engine according to a first preferred embodiment of the present invention.

In FIG. 1, the fuel injection system 1 includes the engine 2, an air mixture device 3 and an electronic control unit (hereinafter referred to as "ECU") 4 which controls the operations of the engine 2 and the air mixture device 3 according to stored programs. The engine 2 is of a four-cylinder type in this embodiment and includes combustion chambers 8 each defined by a cylinder 5 and a cylinder head 7 with a piston 6 disposed therein. A spark plug 9 is arranged as being exposed to each combustion chamber 8.

The induction system of the engine 2 includes intake ports 11 each communicating at its downstream side with the combustion chamber 8 via an intake valve 10, and at its upstream side with an intake pipe 12, a serge tank 13 which is provided for absorbing pulsation of intake air flows, a throttle valve 14 which controls an amount of the intake air to be fed to the combustion chambers 8, and an air cleaner 15.

The exhaust system of the engine 2 includes exhaust ports 19 each communicating at its upstream side with the combustion chamber 8 via an exhaust valve 18, and at its downstream side with an exhaust pipe 20 with a catalytic converter 21 provided therein.

The ignition system of the engine 2 includes an igniter 22 for producing a high voltage necessary for generating ignition sparks at the respective spark plugs 9, and a distributor 23 for distributing the high voltage generated at the igniter 22 to the corresponding spark plugs 9 according to a monitored angular position of an engine crankshaft (not shown).

The fuel system of the engine 2 includes a fuel tank 24 for reserving the fuel, a fuel pump 25 for pressurizing the fuel, and electromagnetic fuel injectors or solenoid fuel injection valves 26 each injecting the pressurized fuel into the corresponding intake port 11.

The air mixture device 3 includes air mixture ducts 27 each for introducing a portion of the intake air in tile intake pipe 12 on the upstream side of the throttle valve 14 to an area where the fuel is injected from the corresponding fuel injection valve 26, for facilitating atomization of tile injected fuel. The air mixture device 3 further includes an air control valve 28, in the form of a two-port two-position solenoid valve, disposed in each air mixture duct 27. The air control valve 28 is controlled by the ECU 4 to open and close for opening and closing the air mixture duct 27, i.e. for controlling communication between the intake pipe 12 on the upstream air side of the throttle valve 14 and the area where the fuel is injected via the fuel injection valve 26.

The fuel injection system 1 further includes various sensors, such as, an airflow meter 31 of a vane type arranged upstream of the throttle valve 14 in the intake pipe 12 for producing a signal indicative of an intake air quantity, an intake air temperature sensor 32 provided in the airflow meter 31 for producing a signal indicative of an intake air temperature, a throttle position sensor 33 for producing a signal indicative of an opening degree of the throttle valve 14, an idle switch 34 for producing a signal indicative of a fully-closed condition of the throttle valve 14, an engine coolant temperature sensor 35 mounted to a cylinder block 5a for producing a signal indicative of an engine coolant temperature, i.e. a temperature of engine cooling water circulated in an engine cooling system, an oxygen sensor 36 provided in the exhaust pipe 20 for monitoring a residual oxygen concentration in the exhaust gas to produce an air-fuel ratio indicative signal to be used in the air-fuel ratio feedback control, and a rotation angular sensor 37, doubling as an engine speed sensor, for producing a pulse signal per 1/24 rotation of a camshaft of the distributor 23, i.e. per 30° CA (crank angle).

These sensor signals are fed to the ECU 4 which controls the operations of the engine 2 and the air mixture device 3 based on the received sensor signals. The ECU 4 includes a CPU 4a, a ROM 4b and a RAM 4c forming a logical operation circuit which is connected to input/output circuits 4e via a common bus 4d for communication with peripheral devices including the foregoing sensors, fuel injection valves 26, distributor 23, air control valves 28 and so on.

Figure 2:
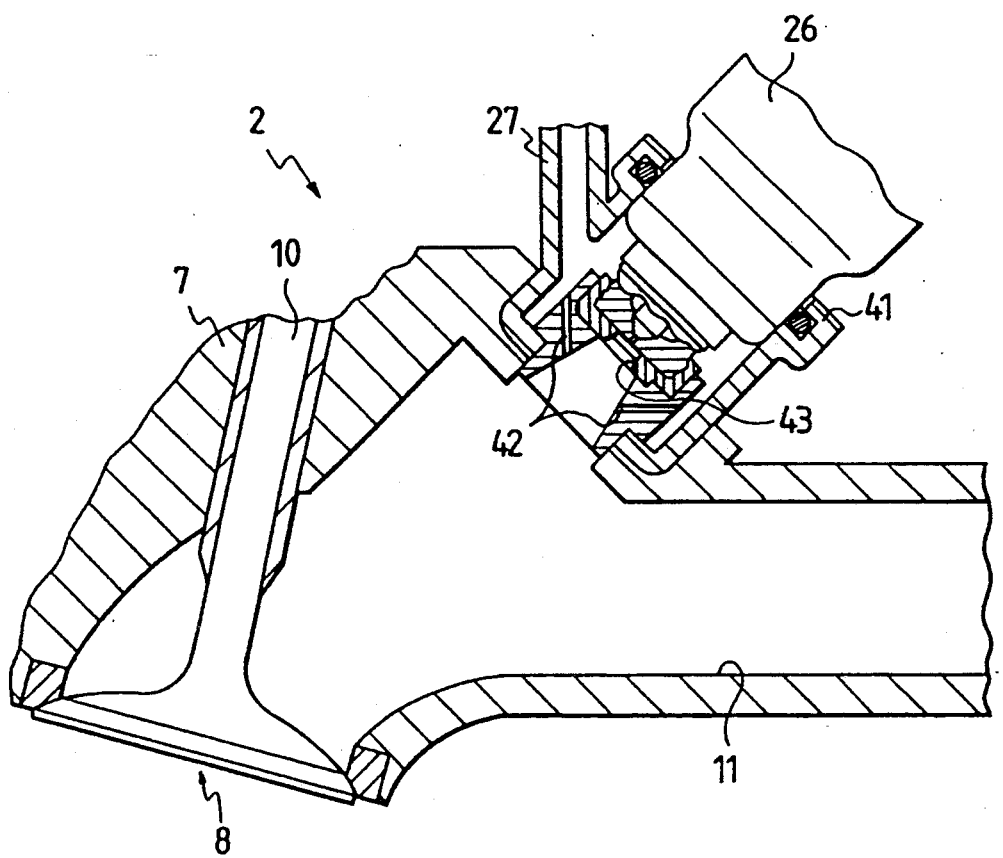
FIG. 2 is a partial enlarged sectional view showing a detailed structure around an area where fuel is injected from a fuel injection valve incorporated in the fuel injection system of FIG. 1.

FIG. 2 is a partial enlarged sectional view showing a detailed structure around the area where the fuel is injected via the fuel injection valve 26.

As shown in FIG. 2, an air mixture socket 41 is fixedly mounted to the cylinder head 7 at the intake port 11 to provide the area where the fuel injected from the fuel injection valve 26 is mixed with the intake air supplied via the air mixture duct 27. Specifically, the air mixture socket 41 is formed with a plurality of air injection holes 42 for injecting the intake air conducted by the air mixture duct 27 into that area and with a fuel injection hole 43 for injecting the fuel into that area for atomization thereof with the injected intake air. It is to be noted that sectional passage or open areas of the air mixture duct 27 as well as the air control valve 28 when fully opened are respectively set about three times as large as a sum of a sectional passage or open area of each air injection hole 42. Since the air injection holes 42 provide the first substantial reduction in sectional open area relative to the air mixture duct 27 and the air control valve 28, the intake air introduced through the air mixture duct 27 is largely throttled when passing through the air injection holes 42, so as to be injected therefrom to atomize the injected fuel from the fuel injection hole 43 (hereinafter, the intake air introduced via the air mixture duct 27 will be also referred to as "the mixing air").

During the engine running, the inside of the intake port 11 is maintained at a vacuum pressure, while the inside of the intake pipe 12 upstream of the throttle valve 14 is maintained at a pressure close to the atmospheric pressure. As a result, due to a pressure differential therebetween, the mixing air is introduced to the air mixture socket 41 from the upstream side of the throttle valve 14 through the air mixture duct 27 when the air control valve 28 is opened. The mixing air is then injected through each air injection hole 42 to hit and atomize the fuel in the form of droplets injected through the fuel injection hole 43 of the fuel injection valve 26. As described above, since the air injection holes 42 provide the first substantial throttling against the mixing air introduced through the air mixture duct 27 when the air control valve 28 is opened, a flow velocity of the mixing air is increased to the maximum when passing through the air injection holes 42. This large kinetic energy of the mixing air flow is used to effectively atomize the injected fuel. The atomized fuel then flows into the intake port 11 as a jet flow.

It is to be noted that the fuel injection system 1 in this preferred embodiment is not provided with an air supply passage for an exclusive use for ensuring the idle running of the engine 2. As will be described later in detail, in this preferred embodiment, the engine idle operation is ensured solely by the mixing air introduced by the air mixture duct 27. In this respect, in case of the four-cylinder engine, the sum of the sectional open areas of the air injection holes 42 for the four engine cylinders is set to such a magnitude that can supply an air amount as required for the fast idle at the cold temperature, for example, 30 m$^3$/h.

Now, a control routine to be executed by the ECU 4 for controlling the operations of the fuel injection valves 26 and the air control valves 28 will be described hereinbelow according to the first preferred embodiment of the present invention.

Figure 3:
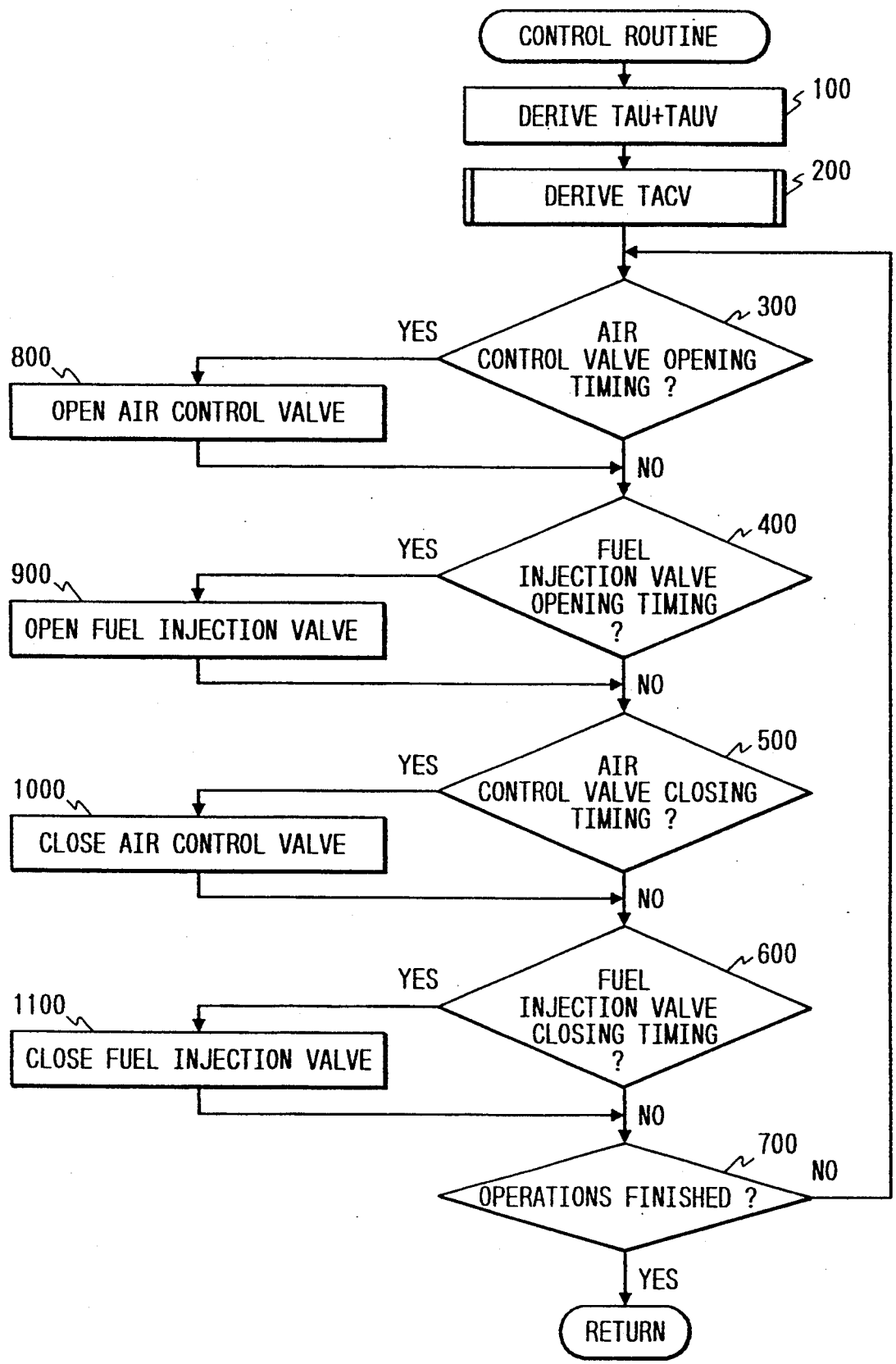
FIG. 3 is a flowchart of a control routine to be executed by an electronic control unit shown in FIG. 1 for controlling operations of fuel injection valves and air control valves according to the first preferred embodiment of the present invention.
Figure 4:
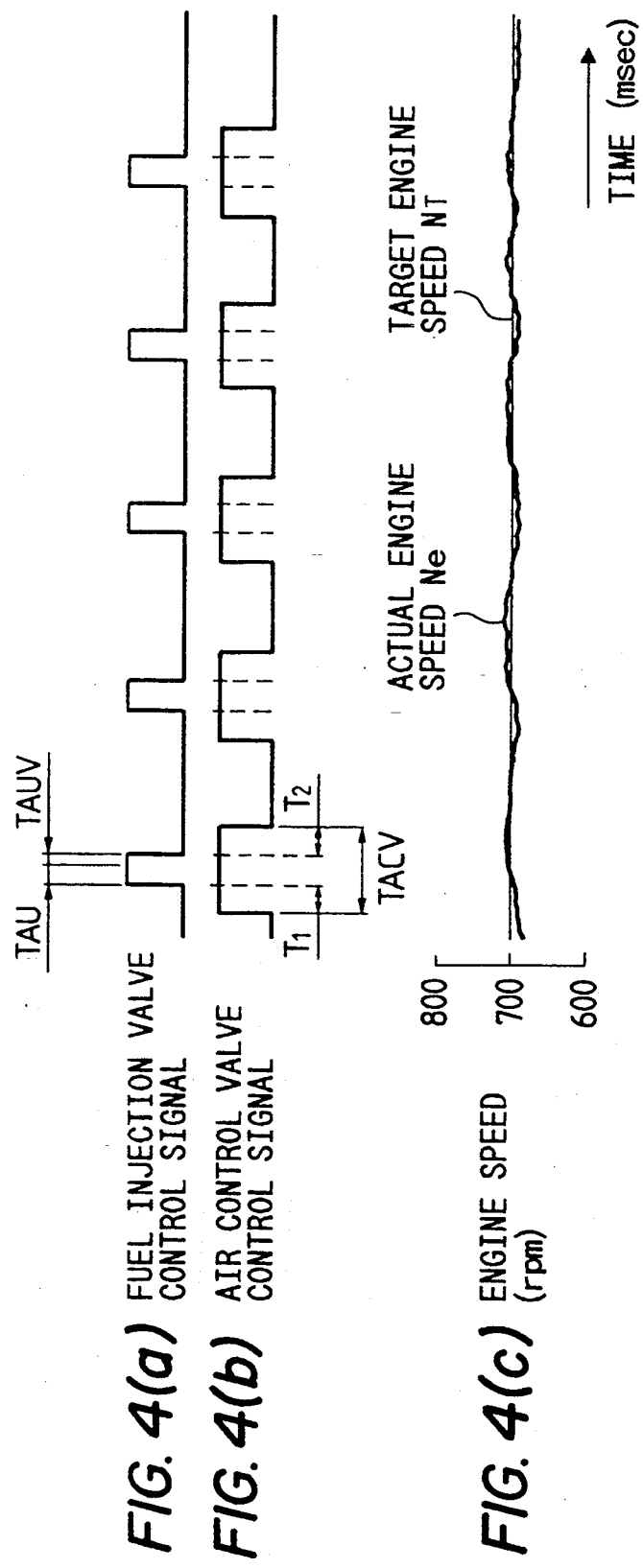
FIGS. 4(a) through 4(c) are time charts showing control signals for the fuel injection valves and the air control valves under a condition, wherein an actual or monitored engine speed is converged to a target engine speed.

FIG. 3 shows a flowchart of the control routine to be executed by the ECU 4 in sequence for controlling the operations of the fuel injection valves 26 and the air control valves 28. FIGS. 4(a) through 4(c) show a time chart of control signals for the fuel injection valves 26 and the air control valves 28 under a condition where an actual engine speed Ne is converged to a target engine speed N$_T$.

The control routine of FIG. 3 is executed per predetermined timing. When, for example, the control routine is executed per 360° CA, one cyclic execution thereof controls two of the four fuel injection valves 26 and the corresponding two of the four air control valves 28.

At a first step 100, the ECU 4 calculates a valve opening duration or time (TAU+TAUV) of the fuel injection valve 26 which represents a corresponding total fuel injection amount. Specifically, as is well known, the ECU 4 derives a basic fuel injection amount Q/Ne by dividing an intake air quantity Q monitored by the airflow meter 31 by an engine speed Ne monitored by the rotation angular sensor 37. The ECU 4 further derives various correction coefficients based on the signals from, such as, the engine coolant temperature sensor 35, the intake air temperature sensor 32 and the oxygen sensor 36 to derive a valve opening time TAU by multiplying the basic fuel injection amount Q/Ne by these correction coefficients. The ECU 4 further derives a dead injection time TAUV using a stored map which defines the dead injection time TAUV in terms of a battery voltage, so as to finally derive the valve opening time (TAU+TAUV) by adding TAUV to TAU. The valve opening time (TAU+TAUV) represents an energization time of the fuel injection valve 26.

Subsequently, at a step 200, a valve opening duration or time TACV representing an energization time of the air control valve 28 is derived by adding a rise point correction time T1 and a fall point correction time T2 to the valve opening time (TAU+TAUV) of the fuel injection valve 26 derived at the step 100. The rise point correction time T1 represents how long a valve opening timing of the air control valve 28 should be advanced relative to a valve opening timing of the fuel injection valve 26. On the other hand, the fall point correction time T2 represents how long a valve closing timing of the air control valve 28 should be retarded relative to a valve closing timing of the fuel injection valve 26. The details of the process at the step 200 will be described later with reference to FIGS. 5 to 10.

The routine now proceeds to a step 300 which determines whether the valve opening timing of the air control valve 28 has been reached, i.e. whether a timing which is advanced by the aforementioned rise point correction time T1 relative to the preset valve opening timing of the fuel injection valve 26 (for example, per 5° CA BTDC for each engine cylinder), has been reached. When answer at the step 300 is NO, then the routine proceeds to a step 400 which determines whether the valve opening timing of the fuel injection valve 26 has been reached. As described above, since the valve opening timing of the fuel injection valve 26 is always delayed relative to that of the air control valve 28, the step 400 produces a negative answer by determining that the valve opening timing of the fuel injection valve 26 has not been reached.

The routine now proceeds to a step 500 which determines whether the valve closing timing of the air control valve 28 has been reached. Since the air control valve 28 has not even opened yet, the step 500 produces a negative answer by determining that the valve closing timing of the air control valve 28 has not been reached. At a subsequent step 600, it is determined whether the valve closing timing of the fuel injection valve 26 has been reached. Similarly, since the fuel injection valve 26 has not even opened yet, the step 600 produces a negative answer by determining that the valve closing timing of the fuel rejection valve 26 has not been reached.

The routine now proceeds to a step 700 which determines whether the valve opening and closing operations of the air control valve 28 and the fuel injection valve 26 have been finished or completed. Since answer at the step 700 at this time is NO, the routine returns to the step 300 to repeat the process at the steps 300 through 700.

On the other hand, when answer at the step 300 becomes YES, i.e. the valve opening timing of the air control valve 28 has been reached, a step 800 provides a high level (rise) in a control signal for the air control valve 28 as shown in FIG. 4(b) to open the air control valve 28. Thereafter, the process at the steps 300 through 700 is repeated until the rise point correction time T1 has elapsed since the valve opening timing of the air control valve 28. When the rise point correction time T1 has been reached, the step 400 produces a positive answer, i.e. the valve opening timing of the fuel injection valve 26 has been reached. In response to this positive answer, a step 900 produces a high level (rise) in a control signal for the fuel injection valve 26 as shown in FIG. 4(a) to open the fuel injection valve 26. Thereafter, when the valve opening time (TAU+TAUV) has elapsed since the valve opening timing of the fuel injection valve 26, a step 600 produces a positive answer, i.e. the valve closing timing of the fuel injection valve 26 has been reached. In response to this positive answer, a step 1100 produces a low level (fall) in the control signal for the fuel injection valve 26 as shown in FIG. 4(a) to close the fuel injection valve 26. Thereafter, when the valve opening time TACV has elapsed since the valve opening timing of the air control valve 28, the step 500 produces a positive answer, i.e. the valve closing timing of the air control valve 28 has been reached. In response to this positive answer, a step 1000 produces a low level (fall) in the control signal for the air control valve 28 as shown in FIG. 4(b) to close the air control valve 28. Subsequently, the routine proceeds to the step 700 which determines at this time that the opening and closing operations of the air control valve 28 and the fuel injection valve 26 have been completed to terminate this control routine.

It is to be appreciated that, although the fall point correction time T2 is set to a positive value in the foregoing description to close the air control valve 28 after the fuel injection valve 26 has been closed, the fall point correction time T2 may be set to a negative valve depending on the monitored engine conditions. As appreciated, in this case, the air control valve 28 is closed at the step 1000 in advance of the valve closing of the fuel injection valve 26 performed at the step 1100.

Now, the process at the foregoing step 200 to be executed by the ECU 4 for deriving the valve opening time TACV of the air control valve 28 will be described in detail hereinbelow with reference to FIGS. 5 to 10.

Figure 5:
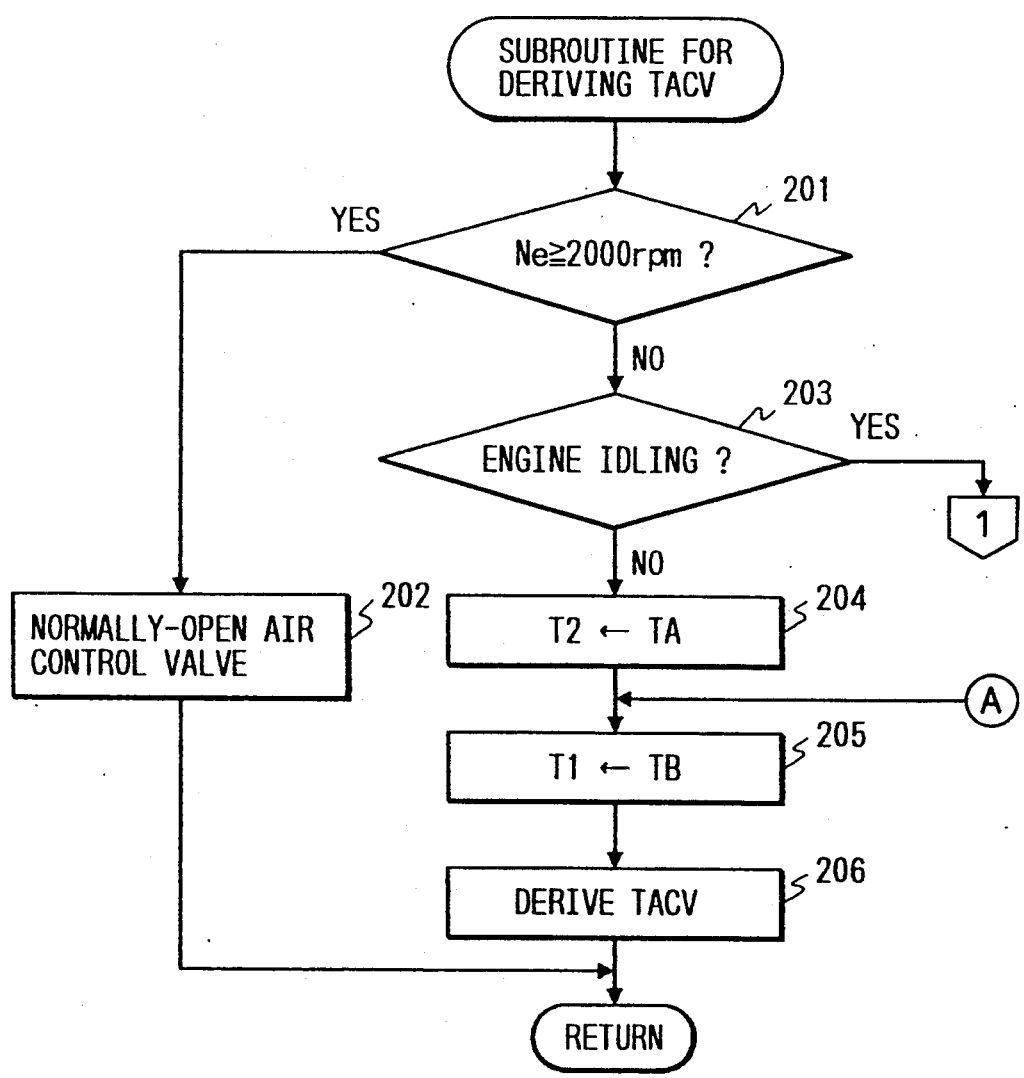
FIGS. 5 and 6 show a flowchart of a subroutine of the flowchart in FIG. 3 for deriving a valve opening time or duration of the air control valve.
Figure 6:
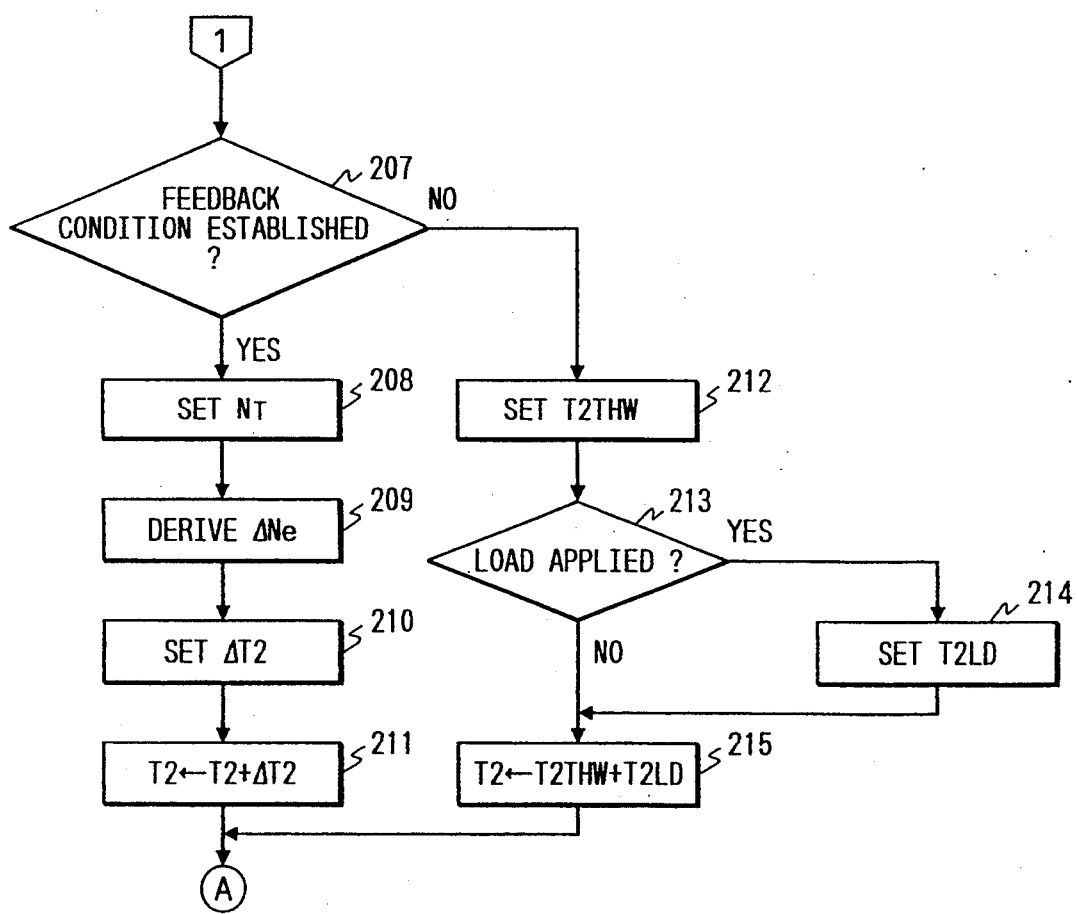
Figure 9:
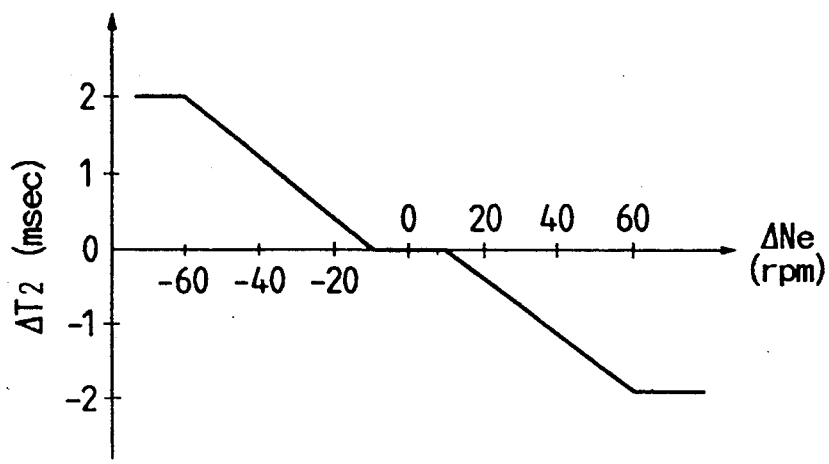
FIG. 9 is a map for setting a correction value for a fall point correction time based on a speed differential between the monitored engine speed and the target engine speed.
Figure 10:
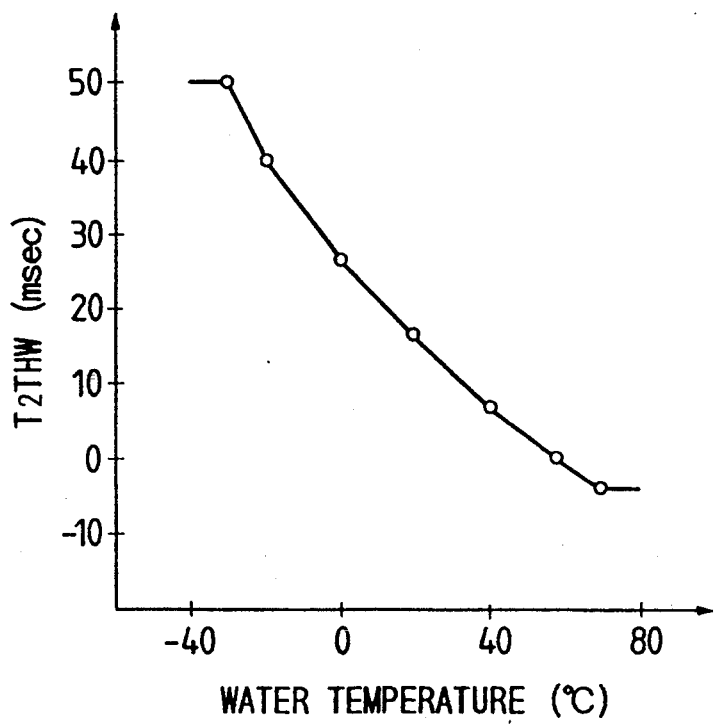
FIG. 10 is a map for setting another correction value for the fall point correction time based on a monitored engine coolant temperature, particularly during an engine fast idling.

FIGS. 5 and 6 show a flowchart of a subroutine corresponding to the step 200 in FIG. 3 for deriving the valve opening time TACV of the air control valve 28. FIGS. 7(a) through 7(f) are time charts showing a state, wherein a supply of the mixing air is substantially synchronous with am actual fuel injection from the fuel injection valve 26. FIGS. 8(a) through 8(c) are time charts showing a relationship between the control signals for the fuel injection valve 26 and the air control valve 28 when the monitored engine speed Ne is dropped due to increment of an engine load. FIG. 9 is a map for setting a correction value $\Delta T2$ for the fall point correction time T2 based on a speed differential $\Delta Ne$ between the monitored engine speed Ne and the target engine speed $N_T$. FIG. 10 is a map for setting a correction value $T2_{THW}$ for the fall point correction time T2 based on the monitored engine coolant temperature, particularly during the fast idle of the engine.

In FIGS. 5 and 6, a first step 201 decides whether the engine speed Ne monitored by the rotation angular sensor 37 is equal to or larger than 2,000 rpm. When answer at the step 201 is YES, a step 202 operates the air control valve 28 as normally open and terminates this subroutine without deriving the valve opening time TACV of the air control valve 28. Accordingly, during the monitored engine speed Ne being equal to or larger than 2,000 rpm, the air control valve 28 is maintained to be open. As appreciated, since the valve opening time TACV is not derived at the step 200 in FIG. 3 when the step 202 in FIG. 5 is executed, the steps 300 and 500 respectively produce negative answers, while, the steps 400, 900, 600 and 1100 are executed based on the aforementioned preset valve opening timing of the fuel injection valve 26 and the valve opening time (TAU+TAUV) derived at the step 100, and the step 700 produces a positive answer after the step 1100 has been executed.

The reason why the step 202 in FIG. 5 maintains the air control valve 28 as normally open is that, although the operations of the fuel injection valve 26 and the air control valve 28 are both controlled in synchronism with the engine rotation through the steps 300 to 1100 in FIG. 3, the response characteristic of the air control valve 28 can not follow-up the high engine speed to cause a delay in the opening and closing operations thereof. Further, since a large amount of the intake air is introduced into the combustion chamber 8 depending on the opening degree of the throttle valve 14 to control the engine speed when the step 202 is executed, it is not necessary to adjust a supply amount of the mixing air through the air mixture duct 27 by controlling the opening and closing operation of the air control valve 28, as opposed to a later-described case of the engine idling where the throttle valve 14 is fully closed.

Since the mixing air is continuously introduced into the area near the fuel injection hole 43 via the air injection holes 42, the atomization of the fuel injected through the fuel injection hole 43 is highly facilitated.

On the other hand, when answer at the step 201 in FIG. 5 is NO, i.e. the monitored engine speed Ne is less than 2,000 rpm, a step 203 determines whether the engine 2 is idling based on an ON/OFF state of the idle switch 34. When answer at the step 203 is NO, i.e. the engine is not idling at a speed less than 2,000 rpm, the routine proceeds to a step 204 where a preset negative value TA is set as the fall point correction time T2. Subsequently, at a step 205, a preset positive value TB is set as the rise point correction time T1, and at a step 206, the valve opening time TACV is derived using the following equation:

$$TACV = T1 + (TAU + TAUV) + T2$$

After the execution of the step 206, this subroutine is terminated to proceed to the step 300 in FIG. 3.

Accordingly, when the air control valve 28 and the fuel injection valve 26 are opened at the respective steps 800 and 900, a rise point (leading edge) in the control signal for the air control valve 28 is advanced relative to that for the fuel injection valve 26 by the fixed rise point correction time T1 as shown in FIG. 7(c). Similarly, when the air control valve 28 and the fuel injection valve 26 are closed at the respective steps 1000 and 1100, a fall point (trailing edge) in the control signal for the air control valve 28 is advanced relative to that for the fuel injection valve 26 by the fixed fall point correction time T2.

In consideration of the response characteristic of the air control valve 28, the inertia of the mixing air and so on, a magnitude of the rise point correction time T1 is set so as to realize a maximum pressure on the upstream side of the air injection holes 42 by means of an increased open area of the air control valve 28 at a time point A in FIGS. 7(b) through 7(f) when the fuel injection is actually started. On the other hand, a magnitude of the fall point correction time T2 is set so as to maintain the maximum pressure on the upstream side of the air injection holes 42 until a time point B in FIGS. 7(b) through 7(f) when the fuel injection is actually finished, and thereafter to rapidly lower the pressure on the upstream side thereof.

Accordingly, during the non-idle or off-idle running of the engine at a speed less than 2,000 rpm, the mixing air is mainly supplied during the actual fuel injection, i.e. the air control valve 28 is maintained to be open for the valve opening time TACV which may be considered to be substantially synchronous with the valve opening time (TAU+TAUV) of the fuel injection valve 26, so that the atomization of the injected fuel is facilitated as in case of the engine speed equal to or larger than 2,000 rpm.

Now, when the step 203 produces a positive answer, i.e. the engine is idling, the routine proceeds to a step 207 in FIG. 6 which determines whether a condition for a feedback control of an idling engine speed is established. As is well known, this feedback control condition represents a condition where the feedback control of the idling engine speed is necessary, and is thus satisfied when, for example, the monitored engine coolant temperature is no less than 80° C. or a vehicle speed is less than 3 km/h. The step 207 produces a positive answer when it determines that the feedback control condition for the engine idling is established, based on the engine coolant temperature monitored by the coolant temperature sensor 35 and the vehicle speed monitored by a vehicle speed sensor (not shown).

At a subsequent step 208, a target idling engine speed $N_T$ is set based on operating conditions of equipped electrical loads, i.e. current consumers such as an air conditioner, and a gear position of a gear shift lever such as an N-range (neutral range) and a D-range (drive range) in case of an automatic power transmission mounted vehicle. The target engine speed $N_T$ may be set to, for example, 700 rpm. Thereafter, a step 209 derives a speed differential $\Delta Ne$ between the engine speed Ne monitored by the rotation angular sensor 37 and the target engine speed $N_T$ based on the following equation:

$$\Delta Ne = Ne - N_T$$

Subsequently, at a step 210, a correction value $\Delta T2$ is set based on the derived speed differential $\Delta Ne$, using a map as shown in FIG. 9. This map is prestored in the ROM 4b and defines the correction value $\Delta T2$ in terms of the speed differential $\Delta Ne$. A subsequent step 211 derives a new value of the fall point correction time T2 by adding the correction value $\Delta T2$ derived at the step 210 to a last or previous value of the fall point correction time T2, i.e. using the following equation:

$$T2 \leftarrow T2 + \Delta T2$$

Now, the routine proceeds to the step 205 where the rise point correction time T1 is set to the preset positive value TB which is identical as in case of the engine off-idling at a speed less than 2,000 rpm. Thereafter, the step 206 derives the valve opening time TACV of the air control valve 28 by adding the rise point correction time T1, the fall point correction time T2 and the valve opening time (TAU+TAUV) of the fuel injection valve 26 in the same manner as described before.

Accordingly, when the air control valve 28 and the fuel injection valve 26 are respectively closed at the steps 1000 and 1100 with the fall point correction time T2 being set to a positive value at the step 211, a fall point in the control signal for the air control valve 28 is delayed relative to that for the fuel injection valve 26 by the fall point correction time T2, as shown in FIG. 4(b). As appreciated, the fall point correction time T2 is corrected by the correction value $\Delta T2$ in such a manner as to reduce the speed differential $\Delta Ne$ between the monitored engine speed Ne and the target engine speed $N_T$ so that the actual engine speed Ne is converged to and maintained at the target engine speed $N_T$, such as, 700 rpm.

For example, when a load applied to a power steering pump is increased due to the rapid steering of the vehicle to sharply drop the engine speed Ne as indicated in FIG. 8(c) at a time point C, the step 209 derives the speed differential $\Delta Ne$ as a negative value so that the step 210 sets the correction value $\Delta T2$ as a positive value as shown in FIG. 9. Accordingly, the fall point correction time T2 is corrected to a lager value at the step 211 to prolong the valve opening time TACV. As a result, a supply amount of the mixing air is increased to restore the engine speed Ne to the target engine speed $N_T$ of 700 rpm. On the other hand, when the air conditioner is activated, the step 208 sets the target engine speed $N_T$ to, for example, 900 rpm. The actual engine speed Ne is controlled to increase to the target engine speed $N_T$ through the steps 209 to 211 in the same manner as described above.

The fall point correction time T2 may have a positive or negative value. When, for example, the load applied to the power steering pump is decreased to increase the engine speed Ne, the fall point correction time T2 may be set to a negative value to shorten the valve opening time TACV of the air control valve 28 so that the actual engine speed Ne is converged to the target engine speed $N_T$.

As appreciated from the foregoing description, when the engine is idling with the feedback control condition being satisfied, the valve opening time TACV of the air control valve 28 is suitably corrected by the fall point correction time T2 so as to converge the engine speed Ne to the target engine speed $N_T$ which is variably set depending on the operations of the equipped current consumers and the gear shift lever position. Accordingly, the mixing air works not only to facilitate the atomization of the injected fuel, but also to control the idling engine speed.

Referring back to the step 207, when the step 207 produces a negative answer, i.e. the feedback control condition is not established, a step 212 sets a correction value $T2_{THW}$ based on the monitored engine coolant temperature, using a map as shown in FIG. 10. This map is prestored in the ROM 4b and defines the correction value $T2_{THW}$ in terms of the engine coolant temperature. Subsequently, a step 213 checks whether any preselected loads for lowering the engine speed Ne is applied or not, i.e. whether the current consumers such as the air conditioner are activated or not, or whether a gear shift lever position is shifted to such as the D-range in case of the vehicle with the automatic power transmission. When answer at the step 213 is YES, then the routine proceeds to a step 214 where a correction value $T2_{LD}$ is set depending on the applied loads as checked at the step 213. Thereafter, at a step 215, the fall point correction time T2 is derived based on the correction values $T2_{THW}$ and $T2_{LD}$, using the following equation:

$$T2 \leftarrow T2_{THW} + T2_{LD}$$

Now, the routine proceeds to the step 205 which sets the rise point correction time T1 in the same manner as described before, and then to the step 206 which derives the valve opening time TACV by adding the rise point correction time T1 set at the step 205, the fall point correction time T2 derived at the step 215 and the valve opening time (TAU+TAUV) of the fuel injection valve 26 in the same manner as described before.

When the step 213 produces a negative answer, i.e. no preselected load is applied, then the step 215 sets the fall point correction time T2 to the correction value $T2_{THW}$ derived at the step 212.

After the execution of the step 206, this subroutine is terminated to proceed to the steps 300 through 1100 as described before.

As shown in FIG. 10, the correction value $T2_{THW}$ is set to a larger positive value as the monitored engine coolant temperature decreases, and to a negative value when the engine coolant temperature is higher than about 70° C. where the engine warming up is substantially completed. As a result, when the air control valve 28 and the fuel injection valve 26 are respectively closed at the steps 1000 and 1100 in FIG. 3, the fall point in the control signal for the air control valve 28 is retarded by the fall point correction time T2 at a low engine temperature as shown in FIG. 4(b) so that the engine speed Ne is increased due to an increasing supply of the mixing air for the fast engine idling. On the other hand, after the engine warming up has been completed, the fall point in the control signal for the air control valve 28 is advanced by the fall point correction time T2 as shown in FIG. 7(c) so that the engine speed is decreased due to a decreasing supply of the mixing air to finish the fast idle operation of the engine.

On the other hand, the correction value $T2_{LD}$ is set at the step 214 to a positive value which is predetermined for each of the loads. Since the correction value $T2_{LD}$ is a positive value, the valve opening time TACV is prolonged when the correction value $T2_{LD}$ is added. As a result, due to an increasing supply of the mixing air, dropping of the idling engine speed Ne is prevented which is otherwise caused due to, for example, a load applied from a torque converter when the gear position is shifted to the D-range from the N-range, or the idling engine speed Ne is increased to some extent for ensuring, for example, the cooling power when the air conditioner is activated.

As appreciated from the foregoing description, when the feedback control condition is not established during the engine idling, the valve opening time TACV is increased or decreased by the fall point correction time T2 so as to control the idling engine speed depending on the engine coolant temperature. In addition, the valve opening time TACV is increased by the fall point correction time T2 when at least one of the preselected loads is applied to the engine, so as to control the idling engine speed depending on the load applied to the engine. As a result, the mixing air under this engine idling condition also works not only to facilitate the atomization of the injected fuel, but also to control the idling engine speed to an optimum level as in case where the feedback control condition is established under the engine idling.

Accordingly, in the fuel injection system of this preferred embodiment, during the engine off-idling at a speed less than 2,000 rpm, the air control valve 28 is maintained to be open for the valve opening time TACV which may be considered to be substantially synchronous with the fuel injection, so as to facilitate the atomization of the injected fuel. On the other hand, during the engine idling with the throttle valve 14 being fully closed, the valve opening time TACV of the air control valve 28 is effectively controlled by the fall point correction time T2 to adjust a supply amount of the mixing air to be fed to the engine so that the mixing air not only facilitates the atomization of the injected fuel, but also maintains the idling engine speed at an optimum value. As a result, the ECU 4 is required to control only the opening and closing operation of the air control valve 28 at the steps 300, 800 and 500, 1000 for adjusting a supply amount of the intake air to the engine during the engine idling, meaning that it is not necessary to provide the idling speed control valve separately of the air control valve 28 and to control an opening degree thereof as in the foregoing conventional fuel injection systems. This largely simplifies the control routine executed by the ECU 4 as well as the fuel injection system as a whole, leading to reduction of the production cost of the ECU as well as the entire fuel injection system.

Further, the air control valve 28 is opened to and maintained at its fully open position when it is opened, i.e. an opening degree of the air control valve 28 is not controlled, which is clear from an air control valve sectional open area as shown in FIG. 7(d). In this preferred embodiment, a sectional open area of each air control valve 28 is set to about 50 mm$^2$ when fully opened so that the total open area of the four air control valves 28 mounts to about 200 mm$^2$ as indicated in FIG. 7(d). This minimizes a pressure loss of the mixing air at the air control valve 28. Accordingly, an intake vacuum generated in the intake port 11 is effectively utilized to largely increase a flow velocity of the mixing air so as to facilitate the atomization of the injected fuel.

Now, a second preferred embodiment of the present invention will be described hereinbelow. The second preferred embodiment differs from the first preferred embodiment only in structure of am air control valve 51 which corresponds to the air control valve 28 in the first preferred embodiment. Since the other structure of the second preferred embodiment is the same as that of the first preferred embodiment, the following description mainly refers to what differs from the first preferred embodiment.

Figure 11:
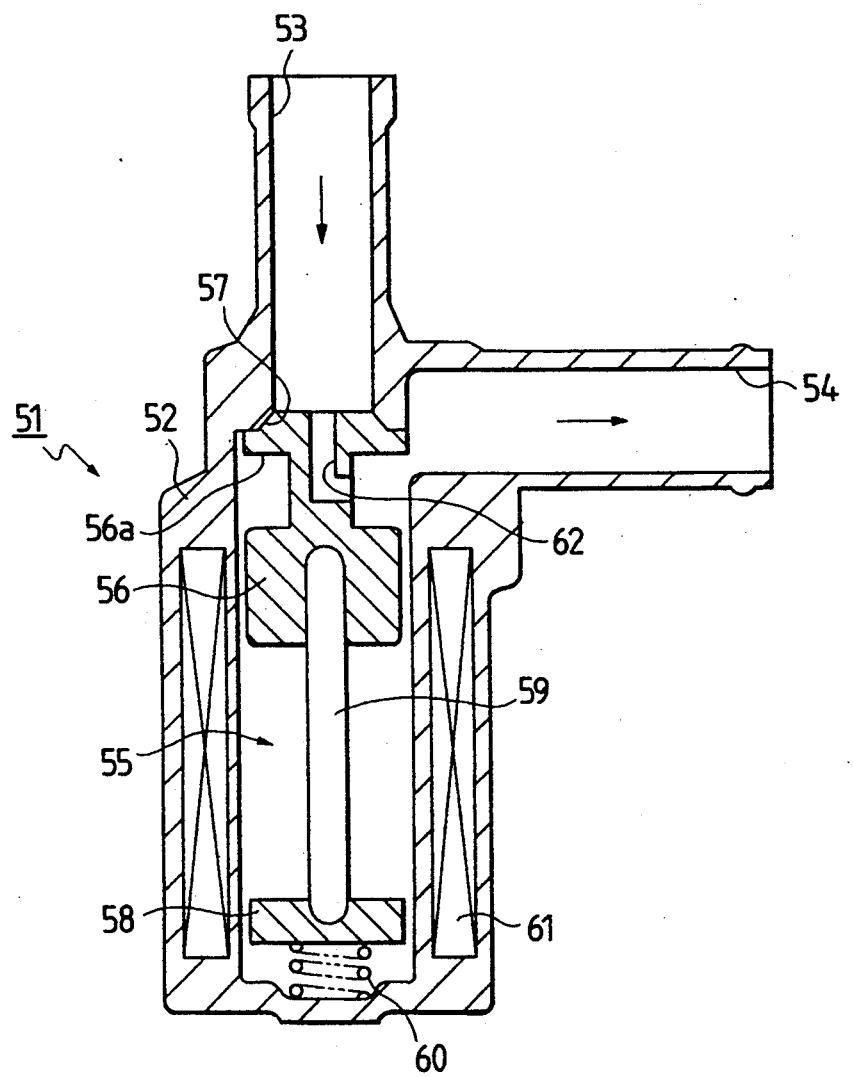
FIG. 11 is a sectional view showing a structure of an air control valve employed in the fuel injection system of FIG. 1, according to a second preferred embodiment of the present invention.

FIG. 11 is a sectional view showing the structure of the air control valve 51 employed in the fuel injection system according to the second preferred embodiment.

In FIG. 11, the air control valve 51 includes a casing 52 which is formed therein with an inlet port 53 and an outlet port 54. The inlet port 53 communicates with the intake pipe 12 upstream of the throttle valve 14 via the air mixture duct 27. The outlet port 54 communicates with the intake port 11 near the fuel injection hole 43 via the air mixture duct 27. Inner diameters of the inlet port 53 and the outlet port 54 are respectively set to 8mm in this preferred embodiment so that a sectional open area of the air control valve 51 is about 50 mm$^2$ when fully opened. The casing 52 is further formed therein with a valve chamber 55. The inlet and outlet ports 53 and 54 are arranged as being normal to each other and communicate with each other in the valve chamber 55 at an upper part thereof. A movable core 56 is arranged at the upper part of the valve chamber 55 as being movable in up-down directions. A valve body 56a of an essentially umbrella shape is formed integral with the movable core 56 at an upper side thereof so that the valve body 56a is movable in accordance with the movement of the movable core 56 to sit on or separate from a valve seat 57 formed at a lower end of the inlet port 53.

The movable core 56 is fixedly connected to a spring bearing member 58 via a rod 59 so that the spring bearing member 58 is located at a lower part of the valve chamber 55 with a compression spring 60 interposed between the spring bearing member 58 and a lower inner wall of the valve chamber 55. Accordingly, by a biasing force of the compression spring 60, the spring bearing member 58, the rod 59 and the movable core 56 with the valve body 56a are integrally urged upward to allow the valve body 56a to normally sit on the valve seat 57. The casing 52 includes therein a coil 61 which is arranged around the valve chamber 55. When the coil 61 is energized, the movable core 56 is displaced downward against the biasing force of the compression spring 60 so as to separate the valve body 56a from the valve seat 57.

The valve body 56a of the movable core 56 is formed therein with an essentially L-shaped auxiliary port 62 which prevents the air control valve 51 from being completely closed even when it is closed, i.e. even when the valve body 56a sits on the valve seat 57. Specifically, an upper end of the auxiliary port 62 is opened at a top of the valve body 56a, while a lower end thereof is opened at a circumferential side of the valve body 56a. Accordingly, the inlet and outlet ports 53 and 54 are constantly in communication with each other via the auxiliary port 62 irrespective of a position of the valve body 56a. The air control valve 51 is thus maintained at a predetermined opening degree even when the valve body 56a sits on the valve seat 57, so as to allow a relatively small amount of the mixing air passing therethrough. An inner diameter of the auxiliary port 62 is set to 2 mm in this preferred embodiment so that a sectional open area of the air control valve 51 is about 3 mm$^2$ when the air control valve is closed, i.e. when the valve body 56a sits on the valve seat 57.

Now, the opening and closing control of the air control valve 51 will be described hereinbelow.

Figure 13:
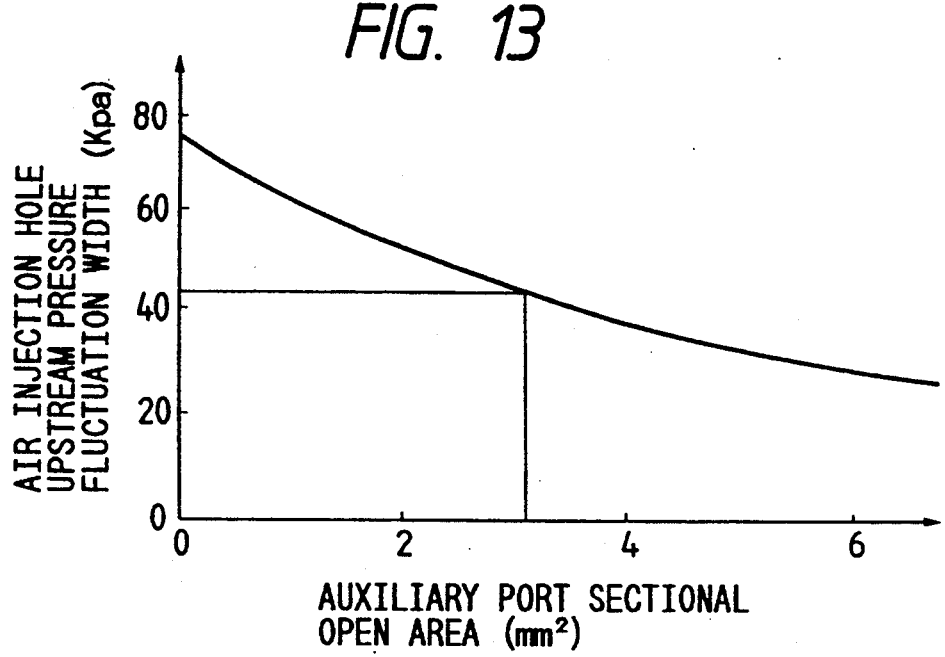
FIG. 13 is a diagram for showing a relationship between a sectional open area of an auxiliary port and a pressure fluctuation width generated upstream of air injection holes.
Figure 14:
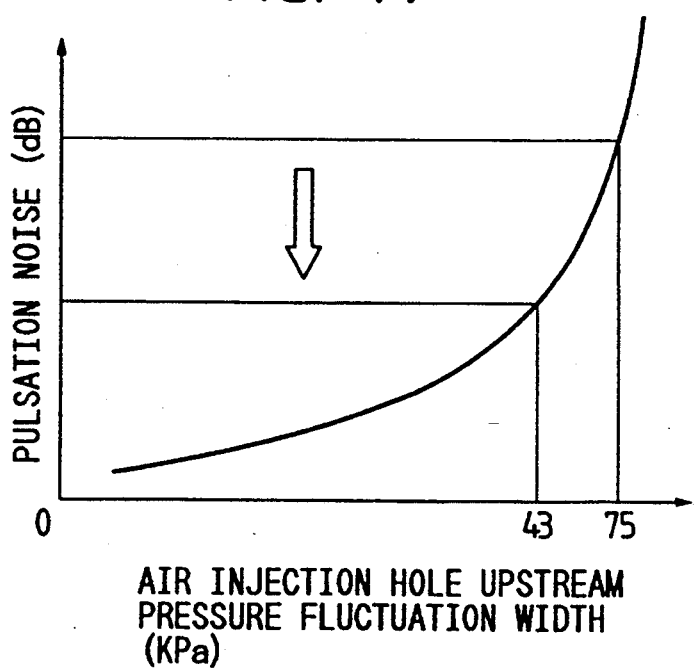
FIG. 14 is a diagram for showing a relationship between a pressure fluctuation width generated upstream of the air injection holes and a level of pulsation noise.

FIGS. 12(a) through 12(f) are time charts showing a state, wherein a supply of the mixing air is substantially synchronous with an actual fuel injection from the fuel injection valve 26. FIG. 13 is a diagram for showing a relationship between a sectional open area of the auxiliary port 62 and a pressure fluctuation width generated upstream of the air injection holes 42. FIG. 14 is a diagram for showing a relationship between a pressure fluctuation width generated upstream of the air injection holes 42 and a level of pulsation noise.

In the second preferred embodiment, the air control valve 51 is controlled by the ECU 4 to open and close in the same manner as in the first preferred embodiment using the control routine of FIG. 3 and its subroutine of FIGS. 5 and 6. As shown in FIGS. 12(a) through 12(f), since a sectional open area of each air control valve 51 is about 50 mm$^2$ when opened, the total open area of the four air control valves 51 is about 200 mm$^2$ as in the first preferred embodiment (FIGS. 7(a) through 7(f)). On the other hand, the total open area of the air control valves 51 does not become 0 (zero) even when closed as opposed to the first preferred embodiment, due to the provision of the auxiliary ports 62, but amounts to about 12 mm² for the four auxiliary ports 62 since each provides about 3 mm² as described above. Accordingly, a small amount of the mixing air is allowed to flow from the inlet port 53 to the outlet port 54 even when the air control valve 51 is in a closed position, so as to maintain a pressure on the upstream side of the air injection holes 42, i.e. at a side of the outlet port 54 at a higher level in comparison with the first preferred embodiment. As a result, a pressure differential is decreased between pressures on the upstream side of the air injection holes 42 at the side of the outlet port 54 when the air control valve 51 is opened and closed, respectively, meaning that a pressure fluctuation width on the upstream side of the air injection holes 42 is reduced in comparison with the first preferred embodiment. As obvious, when the air control valve 51 is opened, the pressure upstream of the air injection holes 42 at the side of the outlet port 54 becomes equal to a pressure upstream of the air control valve 51, i.e. at a side of the inlet port 53 and thus approaches close to the atmospheric pressure.

As shown in FIG. 13, a pressure fluctuation width in the first preferred embodiment is about 75 KPa corresponding to a sectional open area of the auxiliary port 62 being 0 (zero), while a pressure fluctuation width in the second preferred embodiment is reduced to about 43 KPa corresponding to a sectional open area of the auxiliary port 62 being about 3 mm². Accordingly, as further shown in FIG. 14, since a pulsation noise level generated due to the opening and closing operation of the air control valve 51 is in logarithmic relation to the pressure fluctuation width, the reduction of the pressure fluctuation width from 75 KPa to 43 KPa significantly lowers the pulsation noise level in a larger ratio.

As described, the second preferred embodiment employs the air control valve 51 having the inlet and outlet ports 53 and 54 which are mutually connected via the auxiliary port 62 in the valve body 56a even when the air control valve 51 is closed. Accordingly, the auxiliary port 62 provides a predetermined valve opening degree when the air control valve 51 is closed, which is set smaller than a valve opening degree provided when the air control valve 51 is opened.

As a result, in addition to various advantages realized by the first preferred embodiment, the second preferred embodiment largely reduces the pulsation noise level to effectively prevent noise increment in a passenger's compartment. This is accomplished by allowing a small amount of the mixing air through the air control valve 51 even when closed so as to maintain a pressure on the upstream side of the air injection holes 42 at a relatively higher value for decreasing the pressure fluctuation width, i.e. the pressure differential produced when the air control valve 51 is opened and closed.

In the foregoing first and second preferred embodiments, various sensors, such as, the vane type airflow meter 31, the intake air temperature sensor 32, the throttle position sensor 33, the idle switch 34, the engine coolant temperature sensor 35, the oxygen sensor 36 and the engine rotation angular sensor 37 are used for monitoring the engine operating conditions. However, other sensors may be used therefor or in addition thereto as long as various parameters necessary for deriving a fuel injection amount as well as for detecting the engine idling can be obtained. For example, a hot-wire airflow meter may be used in place of the vane type airflow meter to monitor an intake air quantity for determining a fuel injection amount in accordance therewith. Similarly, a vacuum sensor may be used to monitor an intake vacuum in the intake pipe 12 downstream of the throttle valve 14 for detecting the engine idling based on the monitored intake vacuum and the engine speed Ne.

Further, in the foregoing first and second preferred embodiments, when the feedback control condition is established under the engine idling, the idling engine speed Ne is maintained at the target engine speed $N_T$ by the feedback control, and when the feedback control condition is not satisfied, the idling engine speed Ne is controlled depending on the monitored engine coolant temperature, including the fast idle operation when the engine coolant temperature is low, and further depending on the preselected loads applied to the engine. However, other control manners may be employed as long as the idling engine speed is controlled to a desired target value by correcting the valve opening time TACV of the air control valve 28 or 51. For example, when the feedback control condition is not established, the correction of the valve opening time TACV depending on the preselected load condition may be omitted.

Still further, in the foregoing first and second preferred embodiment, when the engine 2 is idling, the valve opening time TACV is controlled by correcting the fall point correction time T2 to change a fall point timing of the control signal for the air control valve 28 or 51, so as to adjust a supply mount of the mixing air. However, other control manners may be employed as long as a total length of the valve opening time TACV is properly corrected. For example, a supply mount of the mixing air may be adjusted by correcting the rise point correction time T1 to change a rise point timing of the control signal for the air control valve 28 or 51. Alternatively, a minimum valve opening time TACV of the air control valve 28 or 51, which is substantially synchronous with the fuel injection, such as, the valve opening time TACV derived under the engine off-idling at a speed less than 2,000 rpm, may be set as a basic valve opening time TACV. When a supply mount of the mixing air is not sufficient with the basic valve opening time TACV, such as, under particular conditions at the engine idling, a separate valve opening time for the air control valve 28 or 51 is set for correction before or after the basic valve opening time TACV, i.e. instead of correcting the basic valve opening time TACV itself, so that the air control valve 28 or 51 is additionally opened and closed based on the separately set valve opening time so as to supplement a necessary mount of the mixing air.

In addition, in the foregoing second preferred embodiment, the auxiliary port 62 having an inner diameter of 2 mm is employed for preventing the air control valve 51 from being completely closed by providing communication between the inlet and outlet ports 53 and 54 in the air control valve 51. However, other means may be employed as long as the air control valve 51 is not completely closed even when it is in a closed position, i.e. as long as a relatively small opening degree is ensured to allow a small mount of the mixing air to pass therethrough when it is in the closed position. For example, a flow control valve operated by a step motor may be employed, wherein the number of steps in a control signal to be input to the step motor is set to maximum when opening the flow control valve, while the number of steps in the control signal is set to a predetermined minimum value other than 0 (zero) when closing the flow control valve, so as to maintain the flow control valve at a predetermined small opening degree. Similarly, when a flow control valve operated by a linear or rotary solenoid is employed, a duty cycle of a solenoid control signal is controlled to ensure a small opening degree of the flow control valve when it is in a closed position.

Further, in the foregoing first and second preferred embodiments, a portion of the intake air in the intake pipe 12 upstream of the throttle valve 14 is introduced to the area near the fuel injection hole 43 via the air mixture duct 27. However, as in a fuel injection system disclosed in Japanese First (unexamined) Patent Publication No. 57-191454, it may be arranged that intake air pressurized by a booster pump is supplied near the fuel injection hole 43. In this case, the pressurized intake air flow is controlled by the air control valve 28 or 51.

It is to be understood that this invention is not to be limited to the preferred embodiments and modifications described above, and that various changes and modifications may be made without departing from the spirit and scope of the invention as defined in the appended claims.

What is claimed is:

1. A fuel injection system for an internal combustion engine, comprising:
    means for detecting an operating condition of said engine;
    fuel injection means, provided in an induction system of said engine, for injecting a required amount of fuel to said induction system in accordance with said operating condition of said engine detected by said detecting means;
    an air passage for introducing a portion of intake air flowing in said induction system, bypassing a throttle valve, to an area where fuel is injected from said fuel injection means;
    means, provided in said air passage, for opening and closing said air passage;
    operation control means for maintaining said opening and closing means in an opened position for a time period which is substantially synchronous with said fuel injection of said fuel injection means; and
    means for correcting, during engine idling detected by said detecting means, a total opening time of said opening and closing means effected by said operation control means so as to control an idling engine speed to a required value, said correcting means correcting said total opening time so as to reduce a differential between an actual engine speed and a preset target speed, and said correcting means correcting said total opening time based on an engine temperature and further based on a preselected load applied to said engine.

2. A fuel injection system for an internal combustion engine, comprising:
    means for detecting an operating condition of said engine;
    fuel injection means, provided in an induction system of said engine, for injecting a required amount of fuel to said induction system in accordance with said operating condition of said engine detected by said detecting means;.
    an air passage for introducing a portion of intake air flowing in said induction system, bypassing a throttle valve, to an area where fuel is injected from said fuel injection means;
    means, provided in said air passage, for opening and closing said air passage, said opening and closing means including means for providing a predetermined opening degree when said opening and closing means is in a closed position, said predetermined opening degree being set smaller than an opening degree provided when said opening and closing means is in an opened position;
    operation control means for maintaining said opening and closing means in said opened position for a time period which is substantially synchronous with said fuel injection of said fuel injection means; and
    correcting means for correcting, during an engine idling detected by said detecting means, a total opening time of said opening and closing means effected by said operation control means so as to control an idling engine speed to a required value.

3. A fuel injection system for an internal combustion engine, comprising:
    means for detecting an operating condition of said engine;
    fuel injection means, provided in an induction system of said engine, for injecting a required amount of fuel to said induction system in accordance with said operating condition of said engine detected by said detecting means;
    air conducting means for introducing a portion of intake air flowing in said induction system, bypassing a throttle valve, to an area where fuel is injected from said fuel injection means;
    opening and closing means, provided in said air conducting means, for opening said air conducting means to an opened position and for closing said air conducting means to a closed position;
    means for controlling an operation of said opening and closing means, said controlling means, during engine idling detected by said detecting means, deriving a correction value per said fuel injection effected by said fuel injection means to correct a total time said opening and closing means is in said open position in such a manner as to realize a required idling engine speed, said controlling means deriving said total time based on said correction value, a basic value which is synchronous with the corresponding fuel injection, and a first preset fixed correction value, said first preset fixed correction value determining a first time point when said opening and closing means is operated to said opened position and said correction value determining a second time point when said opening and closing means is operated to said closed position, said opened position being continuously maintained between said first time point and said second time point;
    said controlling means, during an engine off-idling detected by said detecting means, deriving per said fuel injection a total continuous time of said opening and closing means operated at said opened position based on said basic time, a second preset fixed correction value, and a third preset fixed correction value, said second preset fixed correction value adjusting said first time point when said opening and closing means is operated to said opened position, and said third preset fixed correction value adjusting said second time point when said opening and closing means is operated to said closed position.

4. A fuel injection system for an internal combustion engine, comprising:

means for detecting an operating condition of said engine;

fuel injection means, provided in an induction system of said engine, for injecting a required amount of fuel to said induction system in accordance with said operating condition of said engine detected by said detecting means;

air conducting means for introducing a portion of intake air flowing in said induction system, bypassing a throttle valve, to an area where fuel is injected from said fuel injection means;

opening and closing means, provided in said air conducting means, for opening said air conducting means to an opened position and for closing said air conducting means to a closed position;

means for controlling an operation of said opening and closing means, said controlling means, during engine idling detected by said detecting means, deriving a correction value per said fuel injection effected by said fuel injection means to correct a total time of said opening and closing means being operated at said opened position to realize a required idling speed of said engine, said controlling means, during engine off-idling at a speed less than a predetermined value, deriving per said fuel injection a total continuous time of said opening and closing means being operated at said opened position based on a basic time with a fixed value correction, said basic time being synchronous with said fuel injection, and wherein said controlling means, during engine off-idling at a speed not less than said predetermined value, maintains said opening and closing means to said opened position.

5. A fuel injection system for an internal combustion engine, comprising:

means for detecting an operating condition of said engine;

fuel injection means, provided in an induction system of said engine, for injecting a required amount of fuel to said induction system in accordance with said operating condition of said engine detected by said detecting means;

air conducting means for introducing a portion of intake air flowing in said induction system, bypassing a throttle valve, to an area where fuel is injected from said fuel injection means;

opening and closing means, provided in said air conducting means, for opening said air conducting means to an opened position and for closing said air conducting means to a closed position, said opening and closing means including means for providing a predetermined opened degree when said opening and closing means is in said closed position, said predetermined opened degree being set smaller than an opened degree provided when said opening and closing means is in said opened position; and means for controlling an operation of said opening and closing means, said controlling means, during an engine idling detected by said detecting means, deriving a correction value per said fuel injection effected by said fuel injection means to correct a total time of said opening and closing means being operated at said opened position per said fuel injection to realize a required idling speed of said engine.

* * * * *